United States Patent
Aerni

(12) 
(10) Patent No.: US 6,301,855 B1
(45) Date of Patent: Oct. 16, 2001

(54) TEMPORARY JOIST HANGER

(75) Inventor: Daniel R. Aerni, Columbus, NE (US)

(73) Assignee: Construction Solutions, Inc., Columbus, NE (US)

( * ) Notice: Subject to any disclaimer, the term of this patent is extended or adjusted under 35 U.S.C. 154(b) by 0 days.

(21) Appl. No.: 09/524,488

(22) Filed: Mar. 13, 2000

(51) Int. Cl.[7] .................................................. E04B 1/38
(52) U.S. Cl. ...................... 52/702; 52/745.05; 403/232.1
(58) Field of Search .............................. 52/702, 713, 715, 52/745.05, 745.21, 712, 745.06; 403/232.1, 230; 248/220.22, 220.41, 220.43, 201

(56) References Cited

U.S. PATENT DOCUMENTS

| | | | |
|---|---|---|---|
| D. 260,964 | 9/1981 | Gilb | D8/373 |
| D. 405,348 | 2/1999 | Orr | D8/354 |
| 4,124,962 | 11/1978 | Lancelot, III et al. | 52/702 |
| 4,192,623 | 3/1980 | Borg | 403/232.1 |
| 4,198,175 | 4/1980 | Knepp et al. | 403/191 |
| 4,455,805 | 6/1984 | Rionda et al. | 52/712 |
| 4,802,786 | 2/1989 | Yauger et al. | 403/232.1 |
| 4,893,961 | 1/1990 | O'Sullivan et al. | 403/232.1 |
| 5,092,096 | 3/1992 | Cornell | 52/702 |
| 5,664,392 | 9/1997 | Mucha | 52/715 |
| 5,732,524 | 3/1998 | Kalker, Jr. et al. | 52/712 |
| 5,743,672 | 4/1998 | Cline | 403/403 |
| 5,836,131 | 11/1998 | Viola et al. | 52/702 |
| 5,938,366 | 8/1999 | Novacck | 403/232.1 |

*Primary Examiner*—Carl D. Friedman
*Assistant Examiner*—N. Slack
(74) *Attorney, Agent, or Firm*—Zarley, McKee, Thomte, Voorhees & Sease; Dennis L. Thomte

(57) ABSTRACT

A temporary joist hanger for use in the construction of a deck extending outwardly from the side of a building comprising a generally flat, horizontally disposed upper end portion having a generally flat, vertically disposed base portion extending downwardly from the outer end thereof. A generally flat side wall portion extends transversely from one of the side edges of the base portion. A joist support extends from the side wall portion for temporarily supporting one end of a joist therein. The joist support is selectively vertically adjustably mounted on the side wall portion to accommodate joists of different widths. The method of constructing a deck utilizing the temporary joist hanger is also described.

18 Claims, 3 Drawing Sheets

TEMPORARY JOIST HANGER

BACKGROUND OF THE INVENTION

1. Field of the Invention

This invention relates to a joist hanger and more particularly to a joist hanger which may be utilized during the construction of a deck.

2. Description of the Related Art

During the construction of a deck which is attached to a house, an elongated 2×12, 2×10, 2×8 or 2×6 wood plate is nailed to the house where the deck is to be located. A plurality of horizontally spaced joists must be secured to the plate at one end and are secured at their outer ends by being positioned on the top of a plate which extends between a plurality of vertical posts or which are nailed or screwed to the inner surfaces of a plate supported on a plurality of vertical posts. The inner ends of each of the joists are normally connected to the plate secured to the house or the plate supported by the posts by means of U-shaped joist hangers which are nailed to the plate or plates. There are plates which are intended to accommodate 2×6s, 2×8s, 2×10s or 2×12s. However, the widths of the joists for each dimension identified above can vary significantly. For example, a carpenter may nail a 2×12 joist hanger to the plate and insert the joist therein only to find that the upper end of the joist, because of irregularities in the thickness of the joist, extends above the upper end of the plate. If the thickness of the joist is considerably less than specified, the upper end of the joist will be disposed below the upper end of the supporting plate. Due to the irregularities in the thicknesses of the joists, the U-shaped joist hangers are normally not utilized until after the joist has been properly positioned adjacent the supporting plate with the upper ends thereof being aligned. However, this method of constructing a deck normally requires two persons. For example, if the inner and outer ends of the joist are to be positioned adjacent the sides of the supporting plates, a person must be positioned at each end of the joist to hold the same in position until the joist has been secured to the supporting plates. If the outer end of the joist is simply supported upon a supporting plate, it is still difficult to place the outer end of the joist on the outer support, maneuver the joist until it is in proper position with respect to the wood plate secured to the exterior of the house, hold the inner end of the joist in position and then secure the inner end of the joist to the wood plate.

SUMMARY OF THE INVENTION

A temporary joist hanger is described as well as the method of constructing a deck. The method of this invention for constructing a deck which extends generally horizontally outwardly from a vertical wall of a building comprises the steps of: (1) securing a vertically disposed wood plate to the vertical wall of the building in a horizontally disposed condition; (2) determining the location on the wood plate where the inner end of a joist is to be secured thereto; (3) providing a support means for supporting the outer end of the joist; (4) removably positioning a temporary joist hanger on the wood plate adjacent the location where the inner end of the joist is to be secured; (5) positioning the outer end of a joist on the support means; (6) positioning the inner end of the joist in the temporary joist hanger; (7) vertically adjusting the inner end of the joist upwardly with respect to the wood plate so that the upper end thereof is aligned with the upper end of the wood plate; (8) partially securing the inner end of the joist to the wood plate; (9) removing the temporary joist hanger from the wood plate; (10) completely securing the inner end of the joist to the wood plate; and (11) securing the outer end of the joist to the support means. The above-described steps are repeated until all of the joists have been so secured.

The temporary joist hanger of this invention comprises a generally flat, horizontally disposed upper end portion having inner and outer ends, and opposite sides; a generally flat, vertically disposed base portion, having upper and lower ends, extending downwardly from the outer end of the upper end portion having opposite side edges; a generally flat side wall portion extending generally transversely from one of said side edges outwardly from said base portion; and a joist support extending from said side wall portion for temporarily supporting one end of a joist thereon. The joist support is selectively vertically mounted on the side wall portion for supporting joists of different widths.

It is therefore a principal object of the invention to provide a method of constructing a deck which utilizes temporary joist hangers.

Still another object of the invention is to provide a temporary joist hanger which enables a person to construct a deck without the assistance of another person.

Yet another object of the invention is to provide a temporary joist hanger for supporting one end of a joist until the joist may be secured to a wood plate.

Yet another object of the invention is to provide a temporary joist hanger which accommodates 2×6, 2×8, 2×10 or 2×12 joists.

Yet another object of the invention is to provide a temporary joist hanger which may be constructed in either a right-hand or left-hand configuration, depending upon if the deck is to be constructed from one end or to be constructed from the other end thereof.

A further object of the invention is to provide a temporary joist hanger which is economical of manufacture, durable in use and refined in appearance.

These and other objects will be apparent to those skilled in the art.

DESCRIPTION OF THE PREFERRED EMBODIMENT

Figure 2:
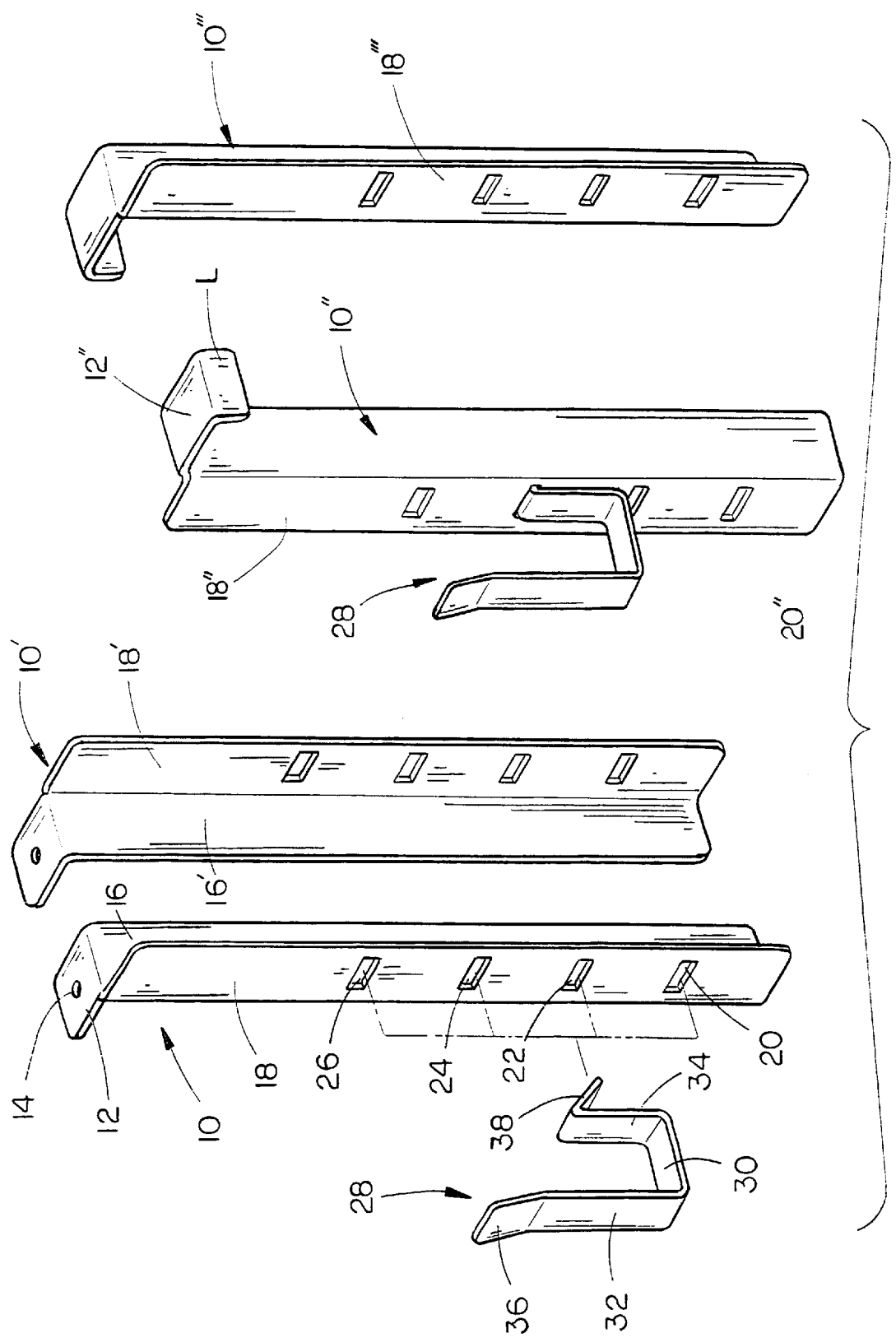
FIG. 2 is a perspective view illustrating the right-hand and left-hand versions of the temporary joist hanger.
Figure 3:
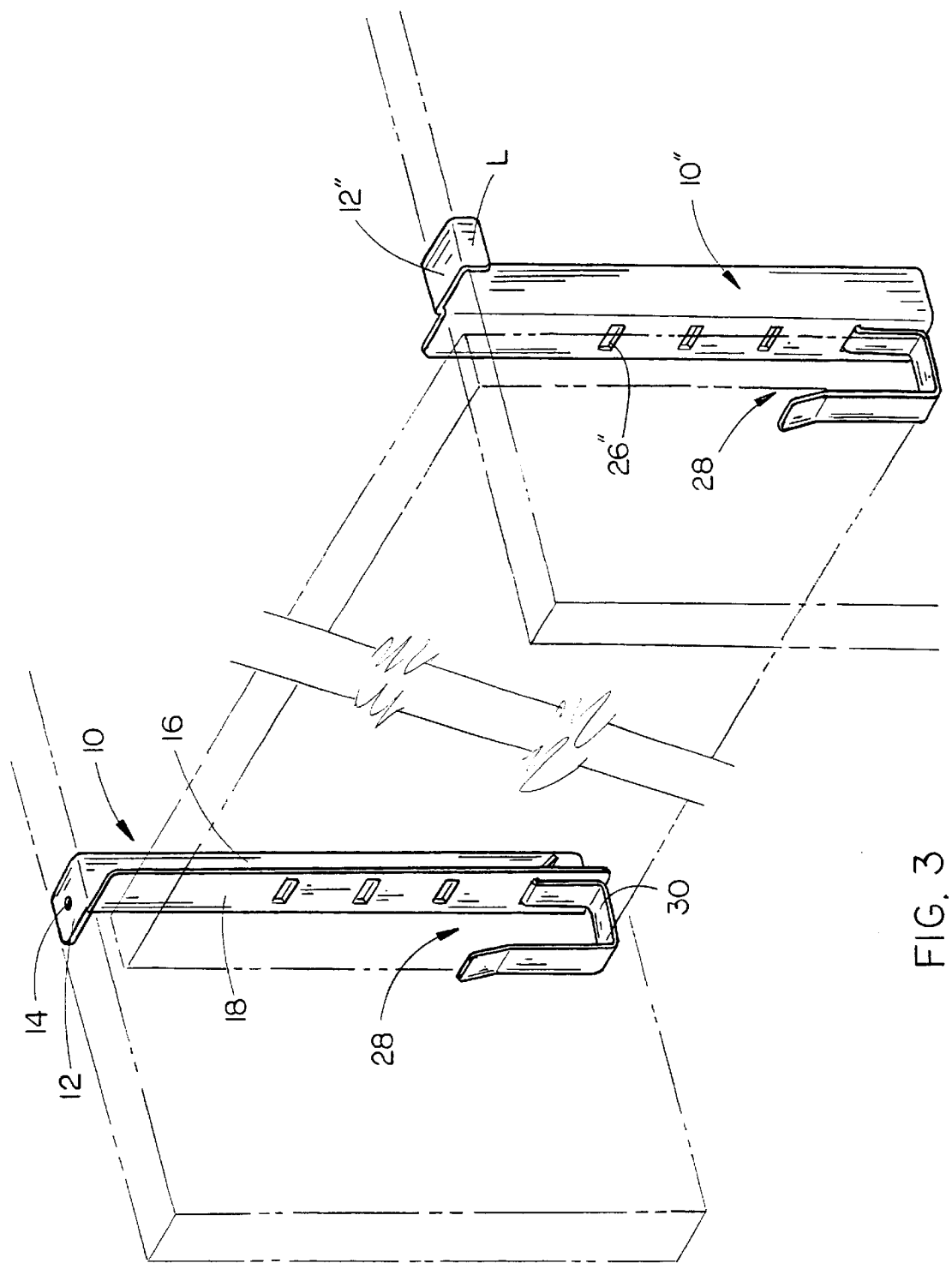
FIG. 3 is a perspective view illustrating the manner in which temporary joist hangers are utilized in the construction of a deck.

The temporary joist hanger of this invention is referred to generally by the reference numeral 10, as seen in FIG. 2. The temporary joist hanger 10 illustrated in FIG. 2 is termed a "right-hand" hanger for use when the deck is to be constructed from the right-hand side of the deck to the left-hand side of the deck. In FIG. 2, the numeral 10' refers to a "left-hand" hanger when the deck is to be constructed from the left side of the deck to the right side of the deck. The temporary joist hanger seen in FIG. 2 and which is referred to by the reference numeral 10" is identical to hanger 10 except that a lip L is provided. In FIG. 2, the numeral 10'" refers to the right-hand version of the left-hand version 10". Due to the very close similarities of all of the hangers, only hanger 10 will be described in detail with certain other features on hangers 10', 10" and 10'" being described.

Temporary joist hanger 10 includes a substantially flat upper end portion 12 having an opening 14 extending downwardly therethrough. A generally flat, vertically disposed base portion 16 extends downwardly from the outer end of the upper end portion 12, as seen in FIG. 2. A generally flat side wall portion 18 extends generally transversely from base portion 16, as also seen in FIG. 2. A plurality of vertically spaced and horizontally disposed slots 20, 22, 24 and 26 are formed in side wall portion 18.

The numeral 28 refers to a joist support which is generally U-shaped in configuration and which includes a bottom wall 30 having an outer wall 32 extending upwardly from the outer end thereof as well as inner wall 34 which extends upwardly from the inner end of bottom wall 30. The upper end of outer wall 32 is provided with an outwardly and upwardly extending portion 36. A clip portion 38 extends inwardly and downwardly from the upper end of inner wall 34 and is adapted to be received in one of the slots 20, 22, 24 and 26.

Hanger 10' is only different from hanger 10 in that the side wall portion 18' extends transversely from base portion 16', on the opposite side of the base portion.

A difference between hanger 10" and hanger 10 is that the upper end portion 12" has a downwardly extending lip L provided at its inner end. Another difference between hanger 10" and hanger 10 is that there is not an opening in upper end portion 12' corresponding to opening 14 . The only other difference between hanger 10" and hanger 10 is that the side wall portion 18" extends from the opposite side edge of the base portion.

Figure 1:
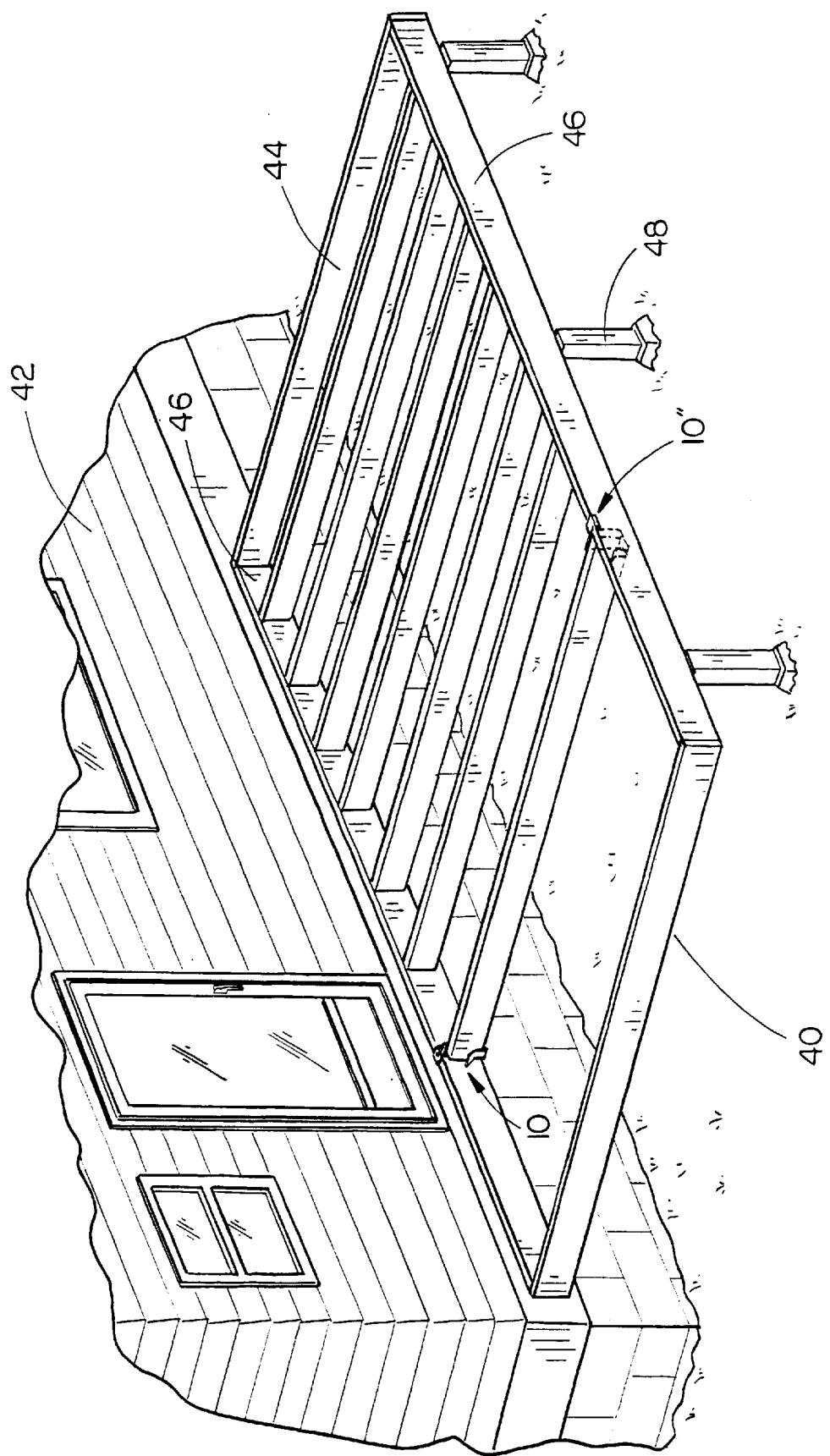
FIG. 1 is a partial perspective view of a house having a deck constructed which extends outwardly therefrom.

Assuming that the deck 40 is to be secured to the building 42 and that the deck is to be constructed from the right-hand side of the deck to the left-side of the deck, as depicted in FIG. 1, and further assuming that the outer end of the joists 44 are to be secured to the inner surfaces of a plate 46 supported upon vertically disposed posts 48, the hangers 10 and 12" will be utilized.

A vertically disposed wood plate 46 is first secured to the outer surface of the building 42 in a horizontally disposed position, as illustrated in FIG. 1. Once the plate 46 has been secured to the building 42 and the plate 46 has been properly positioned on the post 48, the builder first determines the location on the wood plate 46 where the inner ends of the joists are to be secured thereto. The builder also determines the location on the plate 46 where the outer ends of the joists 44 are to be secured. A joist hanger 10 is secured to the wood plate 46 adjacent one of the locations where the joists are to be secured by positioning the upper end portion 12 on the upper end of the plate 46 at one side of the desired location of the joist. Inasmuch as it is not possible to position a lip L between the plate and the building, the hanger 10 does not have a lip L as do hangers 10" and 10'". The hanger 10 is held in position on the plate 46 by extending a fastener such as a nail or screw downwardly through the opening 14 into the plate 46. If the joist 44 is a 2×12 joist, clip 38 is extended through slot 20. If the joist 44 is a 2×10, the clip 38 is extended through the slot 22. If the joist 44 is a 2×8, the clip 38 is extended through the slot 24. If the joist 44 is a 2×6, the clip 38 is extended through the slot 26. After hanger 10 has been temporarily mounted on the plate 46, a hanger 12" would be installed on the plate 46 adjacent the location where the outer end of the joist 44 is to be secured to plate 46 with the lip L extending downwardly over the upper end of the plate 46. Inasmuch as a lip L is utilized on the outer joist hanger, there is no need for tacking or securing the joist hanger 10" to the plate 46.

Assuming that the deck is to be constructed with 2×12 joists, the supports 28 are secured in the lowermost slots 20 and 20' in hangers 10 and 10". The builder then carries the joists 44 to the location of the deck and inserts the inner end of the joist 44 into the support 28 on the hanger 10 and inserts the outer end of the joist 44 in the hanger 28 on the joist 10". The relationship of the supports 28 with respect to the slots 20, 22, 24 and 26 is that when the particular joist is supported on the support 28, the upper end of the joist will be disposed below the upper end of the plate to which it is to be secured to compensate for various width variations in the joists. Once the ends of the joists have been positioned in the supports 28 on the hangers 10 and 10", the builder will raise the inner end of the joist 44 from the support 28 until the upper end of the joist 44 is aligned with the upper edge of the plate 46. At that time, the builder will toe-nail a nail into the upper inner end of the joist 44 and into the plate 46 or will toe-screw a screw into the upper end of the joist 44 and into the plate 46 to temporarily hold the joist 44 in position. That same procedure is repeated at the outer end of the joist 44.

Once the end of the joist has been partially secured to the supporting plate associated therewith, the hanger may be removed from the plate. The ends of the joists are then completely secured to the plates in conventional fashion.

In those types of construction wherein the outer ends of the joists 44 are not secured to the inner surfaces of the plates 46, but are supported on the upper surfaces thereof, hangers 10" and 10'" will not be needed.

The procedure described above is repeated until all of the joists have been secured to their supporting plates. If the deck is to be built from the left side to the right side, the hangers 10' and 10'" will be utilized.

Thus it can be seen that the invention accomplishes at least all of its stated objectives.

I claim:

1. The method of constructing a deck which extends generally horizontally outwardly from a vertical wall of a building, comprising the steps of:

(1) securing a generally horizontally disposed wood plate, having upper and lower ends, to the vertical wall of the building;

(2) providing a joist having an inner end, outer end, upper end and lower end;

(3) determining the location on said wood plate where the inner end of a joist is to be secured thereto;

(4) providing a support means for supporting the outer end of the joist;

(5) removably securing a temporary joist hanger to said wood plate adjacent the location where the inner end of the joist is to be secured;

(6) positioning the outer end of the joist on said support means;

(7) positioning the inner end of the joist in said temporary joist hanger;

(8) vertically adjusting the inner end of the joist upwardly with respect to said wood plate so that the upper end thereof is aligned with the upper end of said wood plate;

(9) securing the inner end of the joist to said wood plate; and

(10) removing the temporary joist hanger from said wood plate.

2. The method of claim 1 wherein the inner end of the joist is partially secured to said wood plate before said temporary joist hanger is removed and wherein the inner end of the partially secured joist is completely secured to said wood plate after said temporary joist hanger is removed from said wood plate.

3. The method of claim 2 wherein said temporary joist hanger is temporarily secured to said wood joist by means of a nail.

4. The method of claim 2 wherein said temporary joist hanger is temporarily secured to said wood joist by means of a screw.

5. The method of claim 1 wherein steps (2)–(9) are repeated until all the joists of the deck have been secured to said wood plate.

6. The method of claim 1 wherein the outer end of the joist is positioned on said support means by a temporary joist hanger.

7. The method of claim 6 wherein steps (2)–(9) are repeated until all the joists of the deck have been secured to said support means.

8. The method of claim 1 wherein the temporary joist hanger is removably secured to said wood plate by nailing the temporary joist hanger to said wood plate.

9. The method of claim 1 wherein the temporary joist hanger has plate receiving means on the upper end thereof for receiving the upper end of said wood plate and wherein the temporary joist hanger is removably secured to said wood plate by positioning said plate receiving means on said upper end of wood plate.

10. A temporary joist hanger for supporting one end of a deck joist adjacent a support plate to which the joist is to be secured, comprising:

a generally flat, horizontally disposed upper end portion having inner and outer ends, and opposite sides;

a generally flat, vertically disposed base portion, having upper and lower ends, extending downwardly from the outer end of said upper end portion and having opposite side edges;

a generally flat side wall portion extending generally transversely from one of said side edges outwardly from said base portion;

and a joist support extending from said side wall portion for temporarily supporting one end of a joist thereon; said joist support is selectively vertically adjustably mounted on said side wall portion for supporting joists of different widths.

11. The hanger of claim 10 wherein said joist support defines a generally U-shaped portion for receiving one end of a joist therein.

12. The hanger of claim 10 wherein said side wall portion has inner and outer surfaces and wherein said joist support is positioned at said outer surface of said side wall portion.

13. The hanger of claim 10 wherein said upper end portion has an opening formed therein for extending a fastener therethrough.

14. The hanger of claim 10 wherein a lip portion extends downward from said inner end of said upper end portion.

15. A temporary joist hanger for supporting one end of a deck joist adjacent a support plate to which the joist is to be secured, comprising:

a generally flat, horizontally disposed upper end portion having inner and outer ends, and opposite sides;

a generally flat, vertically disposed base portion, having upper and lower ends, extending downwardly from the outer end of said upper end portion and having opposite side edges;

a generally flat side wall portion extending generally transversely from one of said side edges outwardly from said base portion;

and a joist support extending from said side wall portion for temporarily supporting one end of a joist thereon;
said side wall portion having a plurality of vertically spaced and horizontally disposed slots formed therein; and
said joist support being removably mounted in one of said slots.

16. The hanger of claim 15 wherein said joist support includes a generally U-shaped portion having a bottom wall with inner and outer ends; an outer wall, having upper and lower ends, extending upwardly from said outer end of said bottom wall; an inner wall, having upper and lower ends, extending upwardly from said inner end of said bottom wall; and a clip portion extending inwardly and downwardly from said upper end of said inner wall through one of said slots.

17. The hanger of claim 16 wherein said upper end of said outer wall has an upwardly and outwardly extending portion.

18. The hanger of claim 16 wherein each of said slots correspond to the width of various joists with said slots being located below said upper end portion such that when a particular width joist is supported on said bottom wall of said U-shaped portion of said joist support and said joist support is secured to the matching slot, the upper end of the joist will be positioned below the upper end of the plate to which the joist is to be secured.

* * * * *